(12) United States Patent
Goodwin et al.

(10) Patent No.: US 11,313,303 B1
(45) Date of Patent: Apr. 26, 2022

(54) OXYGEN SENSOR ADAPTIVE IMPEDANCE CONTROL

(71) Applicant: Ford Global Technologies, LLC, Dearborn, MI (US)

(72) Inventors: William Goodwin, Farmington Hills, MI (US); Scott Eckstein Brodesser, Livonia, MI (US); Kenneth John Behr, Farmington Hills, MI (US); John Joseph Virga, West Bloomfield Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/220,385

(22) Filed: Apr. 1, 2021

(51) Int. Cl.
*F02D 41/14* (2006.01)

(52) U.S. Cl.
CPC ..... *F02D 41/1494* (2013.01); *F02D 41/1455* (2013.01); *F02D 41/1458* (2013.01); *F02D 41/1456* (2013.01)

(58) Field of Classification Search
CPC ............ F02D 41/1455; F02D 41/1456; F02D 41/1458; F02D 41/1494
See application file for complete search history.

(56) References Cited

U.S. PATENT DOCUMENTS

| 5,554,951 A | 9/1996 | Gough |
| 6,696,673 B2 | 2/2004 | Okamoto |

*Primary Examiner* — Hung Q Nguyen
*Assistant Examiner* — Mark L. Greene
(74) *Attorney, Agent, or Firm* — Geoffrey Brumbaugh; McCoy Russell LLP (57) ABSTRACT

Methods and systems are provided for adapting a target impedance of an oxygen sensor. In one example, a method may include updating a target impedance of an oxygen sensor based on a difference between an estimated voltage across a sensing element of the oxygen sensor and a reference RMS voltage of the sensing element. The temperature of the oxygen sensor may be adjusted based on the updated target impedance.

20 Claims, 7 Drawing Sheets

OXYGEN SENSOR ADAPTIVE IMPEDANCE CONTROL

FIELD

The present description relates generally to methods and systems for improving the precision of an O2 sensor by adapting a target control impedance in an oxygen sensor.

BACKGROUND/SUMMARY

Intake and/or exhaust gas sensors are utilized to be operated to provide indications of various gas constituents in an internal combustion engine. Output from an oxygen sensor, for example, is used to determine the air-fuel ratio (AFR) of exhaust gas and to evaluate the health of the catalytic conversion component. An oxygen sensor may be disposed in an engine intake passage to determine the concentration of oxygen when intake air is combined with exhaust gas recirculation (EGR) gases. These indications of oxygen concentration may be used to adjust various engine operating parameters such as fueling and a target AFR, for example. In particular, exhaust gas measurements using an oxygen sensor are used to trim fuel and evaluate cylinder to cylinder fueling differences. The precise control of the air fuel ratio provides opportunity for improved emissions and engine efficiency. The fundamental sensing principle of oxygen sensors use the concept of the Nernst principle where the output voltage of the sensor is a function of the element temperature and the oxygen concentration. As such, these oxygen sensors may be heated by a heating element to achieve a desired operating temperature range such that desired oxygen sensing is provided.

A measurement of the electrode and electrolyte impedance of an oxygen sensor may be used to control the temperature of the oxygen sensor. For example, closed loop control may be employed to control the oxygen sensor temperature, where the sensor intended temperature is determined based on a target impedance of an oxygen sensing element in the oxygen sensor.

Various approaches have been used to heat an oxygen sensor to attain the desired operating temperature range. In one example approach, shown by Okamoto in U.S. Pat. No. 6,696,673, a detector element of a gas concentration detector is activated by a heater while avoiding an excessive heating power supply to the heater. An impedance of the detector element is detected, and a duty ratio of the heater current supply is controlled to bring the impedance to a target level. The detector element is pre-heated to a temperature which is lower than a temperature at which the detector element is activated. The duty ratio in the pre-heating control is gradually increased to the full duty ratio at the beginning of the in-operation control.

The inventors herein have recognized potential issues with the above mentioned approach. As one example, as the oxygen sensor is used, the sensor ages over time and the impedance of the sensing element at any given temperature changes. The methods shown by Okamoto do not compensate for this change in impedance due to aging. Temperature of the sensing element is inversely proportional to impedance. If the original target impedance initially set for the (new) sensor is continued to be used to heat the sensing element, and the impedance at the target temperature rises, the sensing element will be heated to a higher temperature than desired. This higher temperature will result in a Nernst voltage that is depressed in certain air fuel ratios and will shift the actual fuel control away from the optimum control point. Also, excessive heating of the sensor may also accelerate sensor aging which may further change the impedance.

In one example, the issues described above may be addressed by a method for an engine of a vehicle, comprising: defining an initial target impedance of a new oxygen sensor and capturing the commanded root mean square (RMS) voltage needed to maintain this impedance point. This RMS heater voltage either as a learned value for this sensor or as an average value of a characterized population of sensors is then used for a determination of the magnitude of sensor impedance aging. Over the life of the oxygen sensor, the actual heater RMS voltage and the new sensor RMS voltage will be compared and the impedance setpoint will be adjusted based on the difference between the current and initial RMS values. In this way, by adapting a target impedance over the course of operation of the oxygen sensor, sensor temperature control may be improved.

As one example, for a new oxygen sensor, a table may be calibrated to map a RMS heater voltage applied to the sensor element corresponding to a target impedance with a plurality of engine steady state speed-load conditions. During subsequent steady state engine operation, upon light-off of an oxygen sensor, a commanded filtered RMS voltage (Vc) applied to the sensor element for heating the sensor element corresponding to a current target impedance may be estimated. A reference voltage (Vt) corresponding to the current target impedance and engine operating conditions may be looked up from the calibrated table. The target impedance may be updated based on the difference between the commanded voltage (Vt) and the reference voltage (Vt). Additionally, the proportional and integral closed loop control parameters may be changed based on the updated target impedance for closed loop control of the sensing element temperature. Further, a part change such as a replacement of an older oxygen sensor with a newer oxygen sensor may be detected based on the updated impedance. Impedance adaptations may be carried out up to a threshold number of times over a drive cycle.

In this way, by updating the target voltage during operation of the oxygen sensor, aging of the sensor may be taken into account and the temperature of the sensor may be controlled based on an actual target impedance rather than an initial target impedance. By using the updated target impedance, accuracy of the sensor output may be improved. The technical effect of using an updated target impedance to account for sensor aging is that overheating of the sensor element due to inaccurate target impedance may be reduced and further aging of the sensor may be slowed down. Overall, by adapting the target voltage over a lifetime of operation of the oxygen sensor, the sensing element may be continued to be heated to a desired operating temperature, and accuracy and reliability of oxygen sensor operation is increased, enabling engine performance to be maintained.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 4:
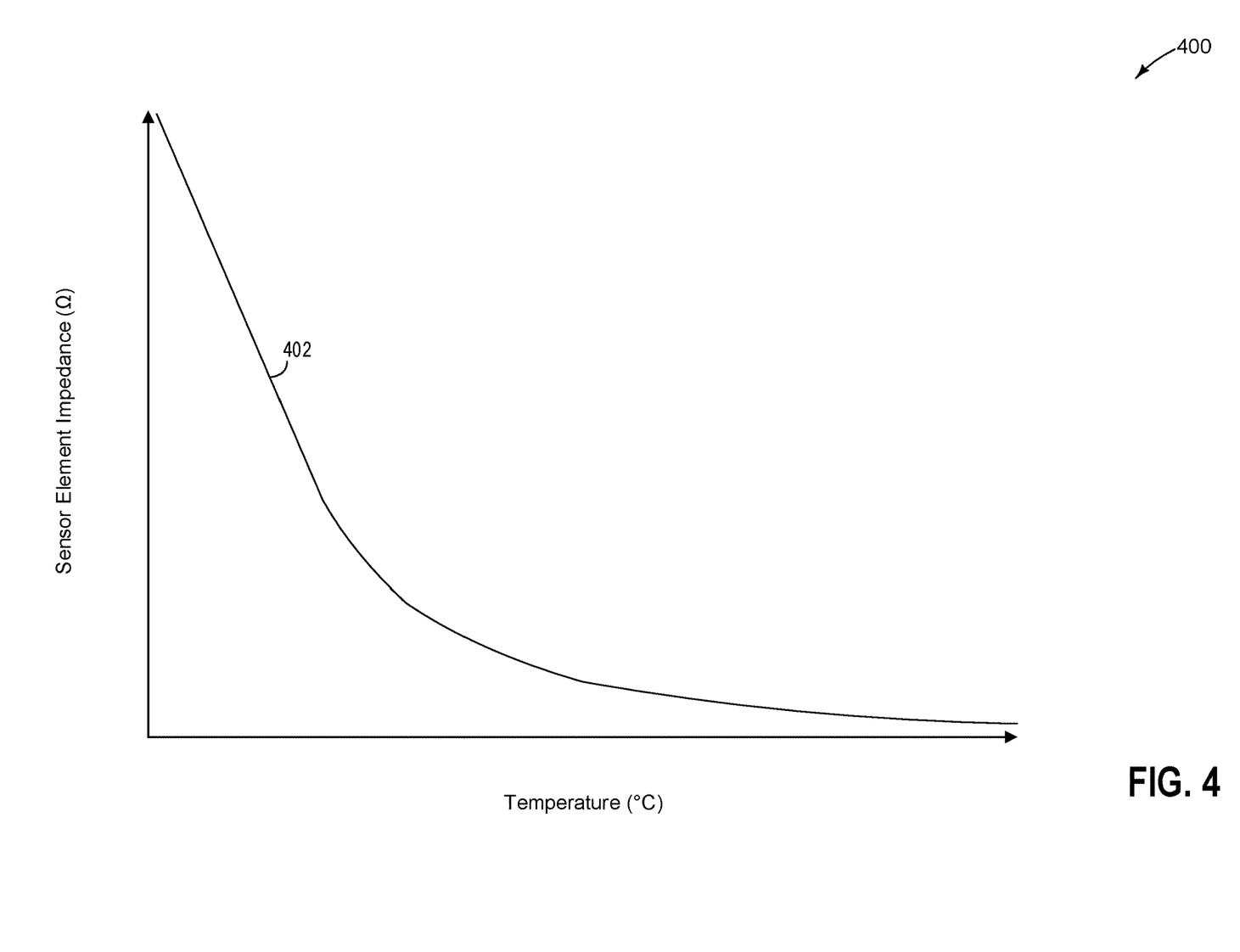
FIG. 4 shows sensor element impedance as a function of temperature for the oxygen sensor.
Figure 5:
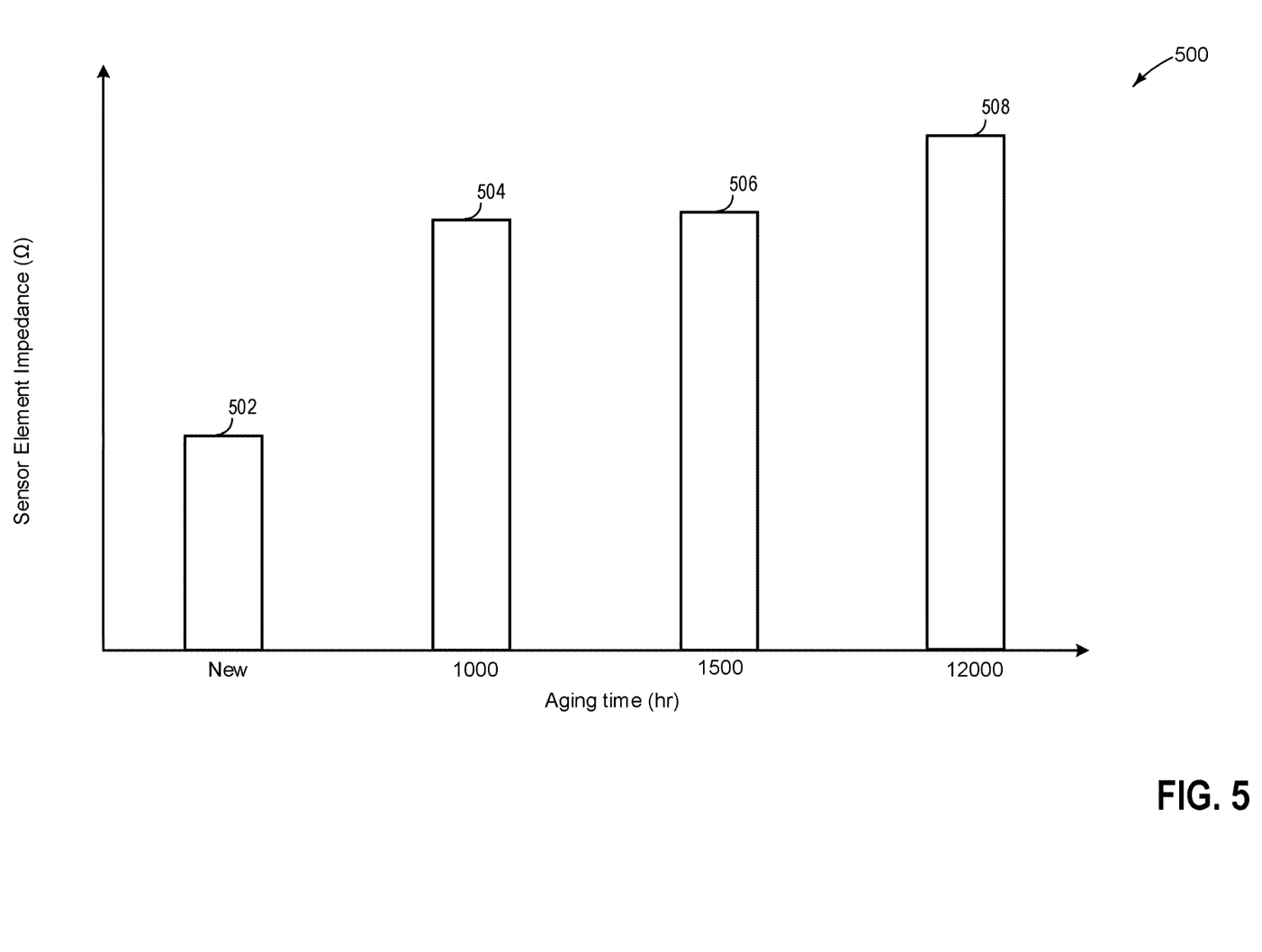
FIG. 5 shows a plot of change in sensor element impedance with aging.
Figure 6:
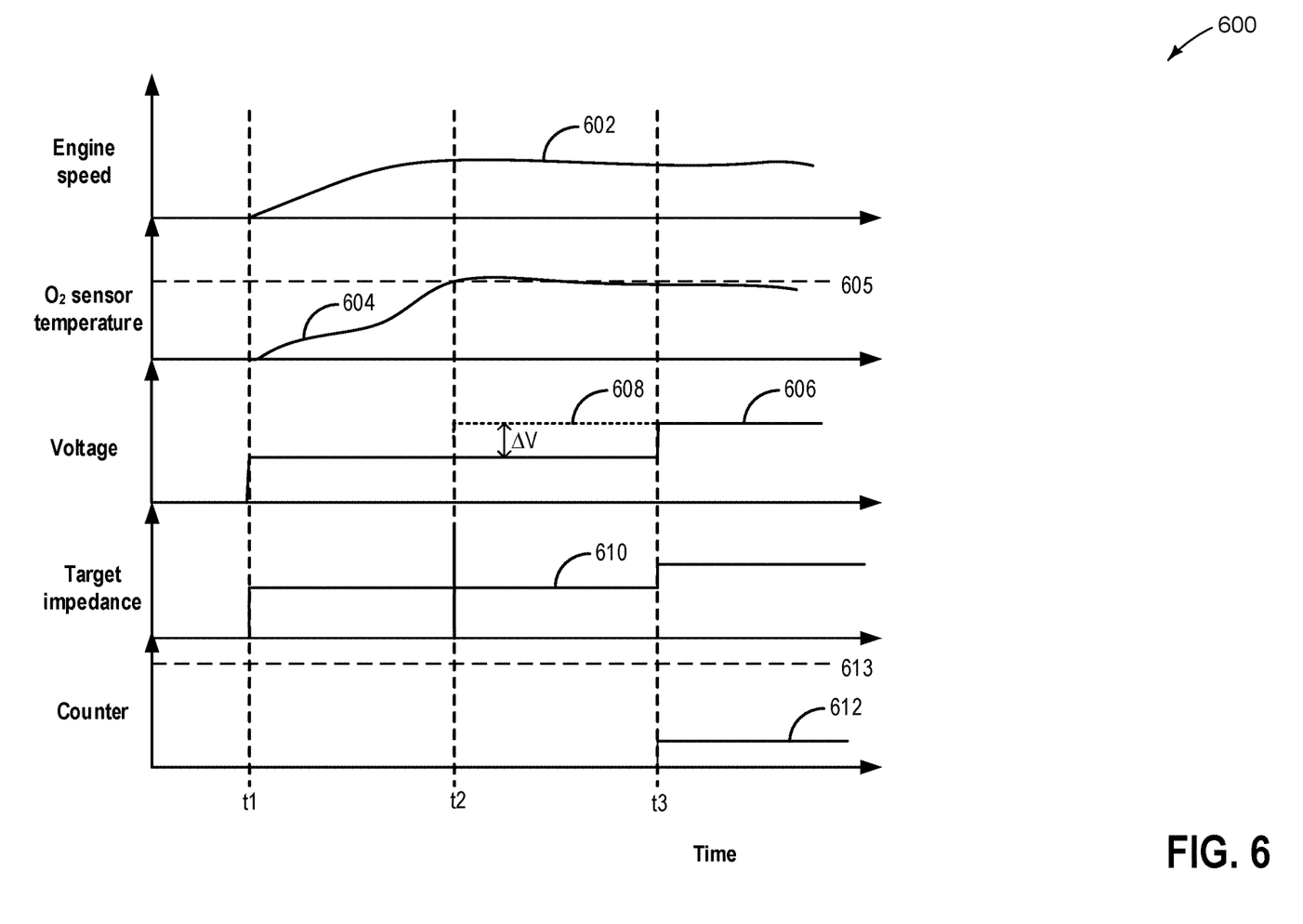
FIG. 6 shows an example adaptation of target impedance in an oxygen sensor.

The following description relates to systems and methods for adapting a target impedance in an oxygen sensor. Oxygen sensors may be disposed in an intake air passage or an exhaust gas passage, as shown in the engine system of FIG. 1. FIG. 2 shows a schematic view of an oxygen sensor that may be affected by thermal aging. A change in sensor element impedance with aging is shown in FIG. 5. An engine controller may be configured to perform a control routine, such as the example routine of FIGS. 3A-3B, to adapt a target impedance of the oxygen sensor based on a difference between a commanded voltage applied to a sensor element and a reference voltage retrieved from a look-up table. A relationship between temperature of the sensing element and sensor element impedance is shown in FIG. 4. An example of adapting the target impedance over a drive cycle is shown in FIG. 6.

Figure 1:
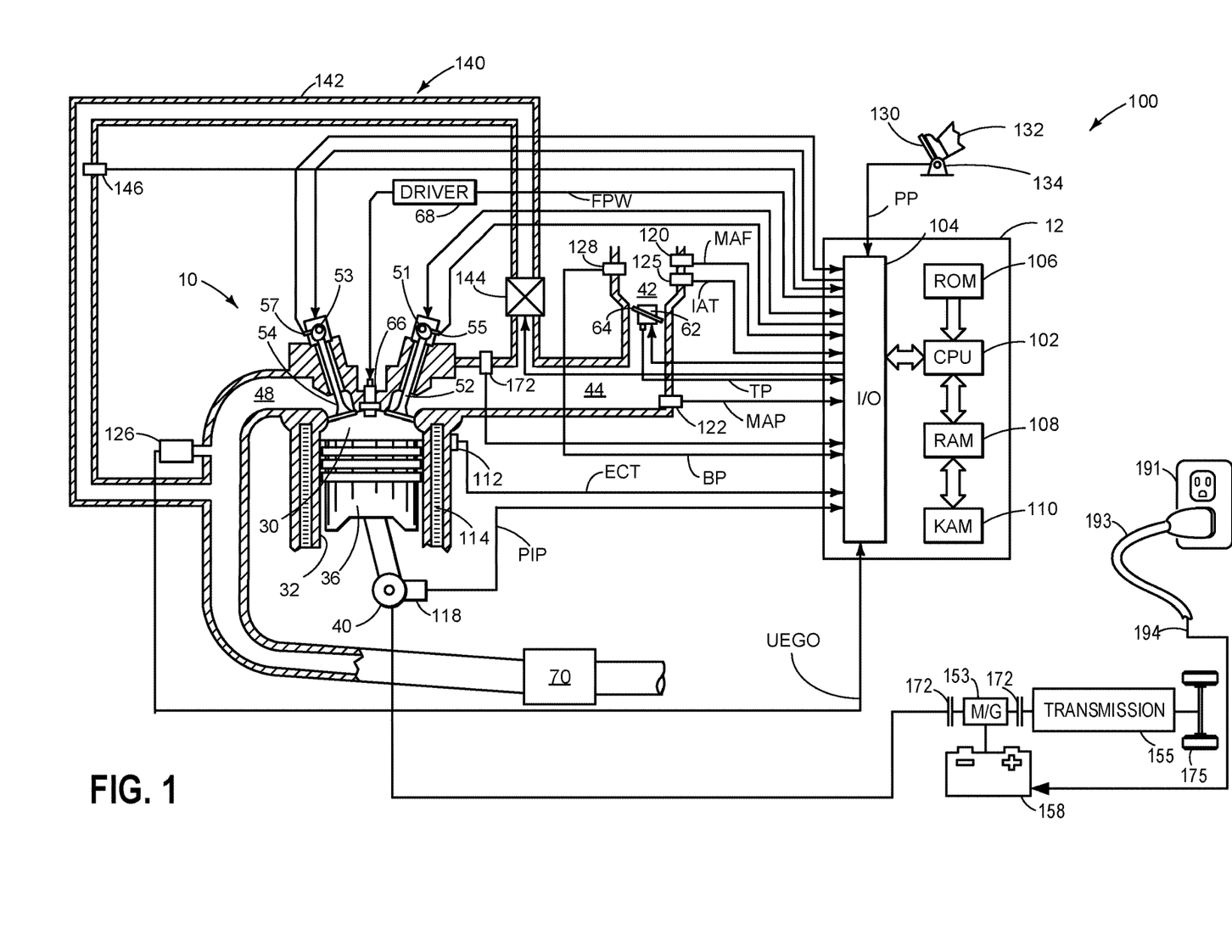
FIG. 1 shows an example engine system including intake and exhaust oxygen sensors.
Figure 2:
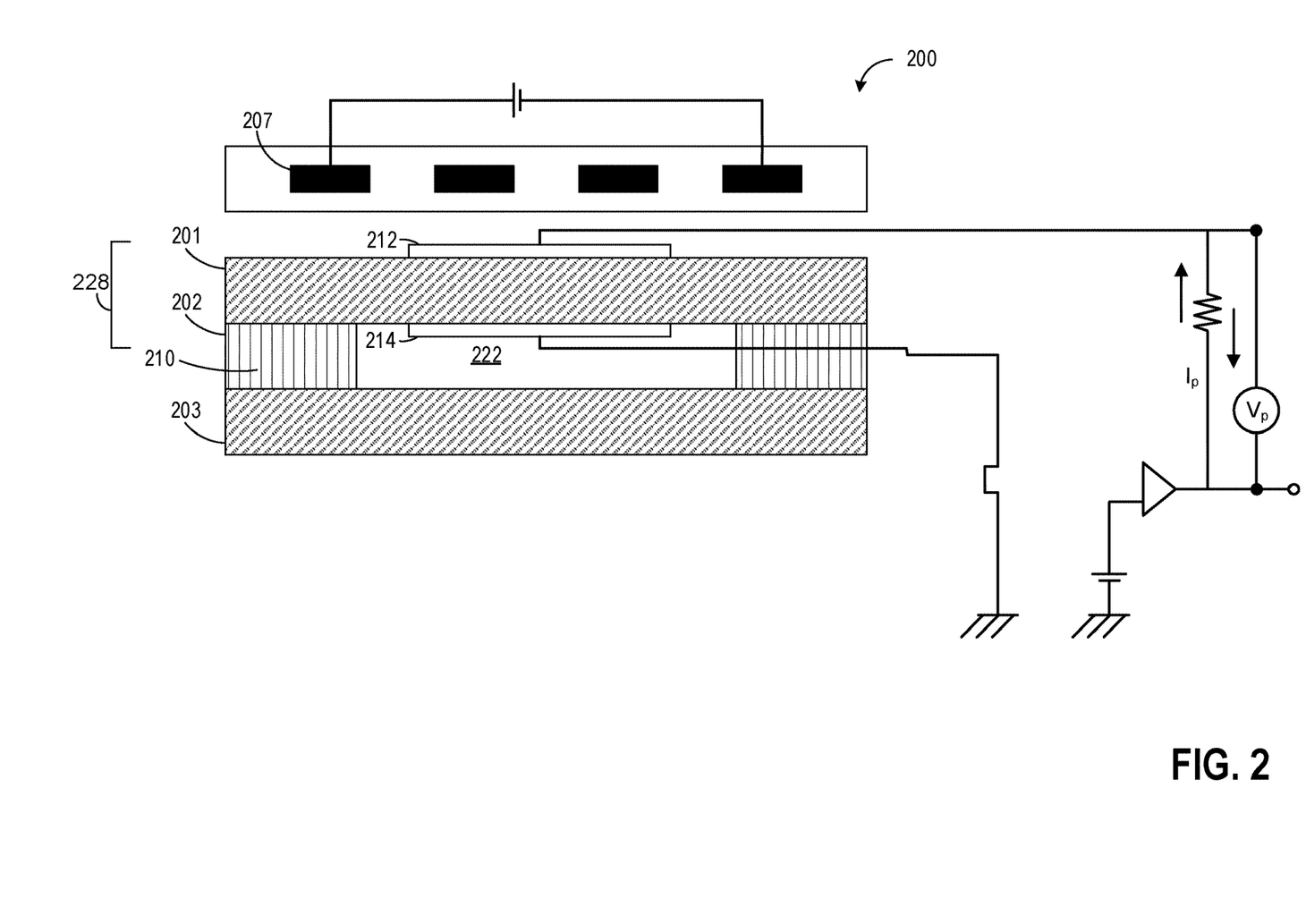
FIG. 2 shows a schematic diagram of an example oxygen sensor.

FIG. 1 is a schematic diagram showing one cylinder of a multi-cylinder engine 10 in a vehicle system 100. The engine 10 may be controlled at least partially by a control system including a controller 12 and by input from a vehicle operator 132 via an input device 130. In this example, the input device 130 includes an accelerator pedal and a pedal position sensor 134 for generating a proportional pedal position signal PP. A combustion chamber (cylinder) 30 of the engine 10 may include combustion chamber walls 32 with a piston 36 positioned therein. The piston 36 may be coupled to a crankshaft 40 so that reciprocating motion of the piston is translated into rotational motion of the crankshaft. The crankshaft 40 may be coupled to at least one drive wheel of a vehicle via an intermediate transmission system. Further, a starter motor may be coupled to the crankshaft 40 via a flywheel to enable a starting operation of the engine 10.

The combustion chamber 30 may receive intake air from an intake manifold 44 via an intake passage 42 and may exhaust combustion gases via an exhaust passage 48. The intake manifold 44 and the exhaust passage 48 can selectively communicate with the combustion chamber 30 via respective intake valve 52 and exhaust valve 54. In some embodiments, the combustion chamber 30 may include two or more intake valves and/or two or more exhaust valves.

In this example, the intake valve 52 and exhaust valve 54 may be controlled by cam actuation via respective cam actuation systems 51 and 53. The cam actuation systems 51 and 53 may each include one or more cams and may utilize one or more of cam profile switching (CPS), variable cam timing (VCT), variable valve timing (VVT), and/or variable valve lift (VVL) systems that may be operated by the controller 12 to vary valve operation. The position of the intake valve 52 and exhaust valve 54 may be determined by position sensors 55 and 57, respectively. In alternative embodiments, the intake valve 52 and/or exhaust valve 54 may be controlled by electric valve actuation. For example, the combustion chamber 30 may alternatively include an intake valve controlled via electric valve actuation and an exhaust valve controlled via cam actuation including CPS and/or VCT systems.

A fuel injector 66 is shown coupled directly to combustion chamber 30 for injecting fuel directly therein in proportion to the pulse width of signal FPW received from the controller 12 via an electronic driver 68. In this manner, the fuel injector 66 provides what is known as direct injection of fuel into the combustion chamber 30. The fuel injector may be mounted in the side of the combustion chamber or in the top of the combustion chamber (as shown), for example. Fuel may be delivered to the fuel injector 66 by a fuel system (not shown) including a fuel tank, a fuel pump, and a fuel rail. In some embodiments, the combustion chamber 30 may alternatively or additionally include a fuel injector arranged in the intake manifold 44 in a configuration that provides what is known as port injection of fuel into the intake port upstream of the combustion chamber 30.

The intake passage 42 may include a throttle 62 having a throttle plate 64. In this particular example, the position of throttle plate 64 may be varied by the controller 12 via a signal provided to an electric motor or actuator included with the throttle 62, a configuration that is commonly referred to as electronic throttle control (ETC). In this manner, the throttle 62 may be operated to vary the intake air provided to the combustion chamber 30 among other engine cylinders. The position of the throttle plate 64 may be provided to the controller 12 by a throttle position signal TP. The air intake passage 42 may include the intake air temperature (IAT) sensor 125 and the barometric pressure (BP) sensor 128. The IAT sensor 125 estimates intake air temperature to be used in engine operations and provides a signal to the controller 12. Similarly, the BP sensor 128 estimates the ambient pressure for engine operations and provides a signal to the controller 12. The intake passage 42 may further include a mass air flow sensor 120 and a manifold air pressure sensor 122 for providing respective signals MAF and MAP to the controller 12.

An exhaust gas sensor 126 is shown coupled to the exhaust passage 48 upstream of an emission control device 70. The sensor 126 may be any suitable sensor for providing an indication of exhaust gas air/fuel ratio (AFR) such as a linear oxygen sensor or UEGO (universal or wide-range exhaust gas oxygen), a two-state or binary oxygen sensor or EGO, a HEGO (heated EGO), a NOx, HC, or CO sensor. A detailed embodiment of the HEGO sensor is described with reference to FIG. 2. An oxygen sensor may be used to estimate the AFR for both intake and exhaust gas. Based on AFR estimation, engine operating parameters e.g. fueling may be regulated. In addition, by utilizing AFR estimate in exhaust gas, operating efficiency of an emission control device may be improved.

The output of an oxygen sensor becomes active above 400 C and is e optimal at a desired element operating temperature around 500-800 Celsius, depending on the sensor design and operating conditions. The sensor may include a heating element to increase the temperature of the sensing element to the desired operating temperature. The impedance of the sensing element of the oxygen sensor may be used to control the temperature of the oxygen sensor. The temperature of the oxygen sensor may be closed loop controlled based on an initial target impedance upon initiation of a drive cycle with the initial target impedance as a setpoint of a proportional integral (PI) controller adjusting power supplied to an oxygen sensor heater. The target impedance of the sensing element may change over time due to thermal aging. In order to adapt the target impedance of the sensor during a drive cycle, a commanded RMS voltage across a sensing element of the oxygen sensor may be measured during vehicle operation with a first set of operating conditions and the initial target impedance. A reference RMS voltage may be looked up corresponding to the initial impedance and the first set of operation conditions from a pre-calibrated table. The first set of operating conditions includes one or more of an engine speed, an engine load, an engine temperature, an exhaust flow, and an exhaust temperature. An updated target impedance may be estimated based on the difference between the commanded RMS voltage and the reference RMS voltage and the initial target impedance. The setpoint of the PI controller adjusting power supplied to an oxygen sensor heater may be changed to the updated impedance using a weighting factor, EWMA filter, or other form of weighting or averaging. A detailed method for updating the target impedance of the sensing element and controlling the temperature of the sensing element based on the updated target impedance will be discussed with reference to FIGS. 3A-B.

The emission control device 70 is shown arranged along the exhaust passage 48 downstream of the exhaust gas sensor 126. The device 70 may be a three-way catalyst (TWC), NOx trap, various other emission control devices, or combinations thereof. In some embodiments, during operation of the engine 10, the emission control device 70 may be periodically reset by operating at least one cylinder of the engine within a particular air/fuel ratio.

Further, an exhaust gas recirculation (EGR) system 140 may route a desired portion of exhaust gas from the exhaust passage 48 to the intake manifold 44 via an EGR passage 142. The amount of EGR provided to the intake manifold 44 may be varied by the controller 12 via an EGR valve 144. Further, an EGR sensor 146 may be arranged within the EGR passage 142 and may provide an indication of one or more of pressure, temperature, and constituent concentration of the exhaust gas. A linear oxygen sensor 172 may be positioned at the intake passage, downstream of the intake throttle, to facilitate EGR regulation. Under some conditions, the EGR system 140 may be used to regulate the temperature of the air and fuel mixture within the combustion chamber, thus providing a method of controlling the timing of ignition during some combustion modes. Further, during some conditions, a portion of combustion gases may be retained or trapped in the combustion chamber by controlling exhaust valve timing, such as by controlling a variable valve timing mechanism.

The controller 12 is shown in FIG. 1 as a microcomputer, including a microprocessor unit 102, input/output ports 104, an electronic storage medium for executable programs and calibration values shown as read only memory chip 106 in this particular example, random access memory 108, keep alive memory 110, and a data bus. The controller 12 may receive various signals from sensors coupled to the engine 10, in addition to those signals previously discussed, including measurement of inducted mass air flow (MAF) from the mass air flow sensor 120; engine coolant temperature (ECT) from a temperature sensor 112 coupled to a cooling sleeve 114; a profile ignition pickup signal (PIP) from a Hall effect sensor 118 (or other type) coupled to crankshaft 40; throttle position (TP) from a throttle position sensor; absolute manifold pressure signal, MAP, from the sensor 122; and exhaust flow from an exhaust pressure sensor. Engine speed signal, RPM, may be generated by the controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, the sensor 118, which is also used as an engine speed sensor, may produce a predetermined number of equally spaced pulses every revolution of the crankshaft.

The storage medium read-only memory 106 can be programmed with computer readable data representing non-transitory instructions executable by the processor 102 for performing the methods described below as well as other variants that are anticipated but not specifically listed. As described above, FIG. 1 shows one cylinder of a multi-cylinder engine, and each cylinder may similarly include its own set of intake/exhaust valves, fuel injector, spark plug, etc.

The controller 12 receives signals from the various sensors of FIG. 1 and employs the various actuators of FIG. 1 to adjust engine operation based on the received signals and instructions stored on a memory of the controller 12. In one example, the controller 12 initiates a routine to update target impedance for temperature control in oxygen sensors 126 and 172.

Vehicle system 100 may include multiple sources of torque available to one or more vehicle wheels 175. In the example shown, vehicle system 100 is a hybrid electric vehicle system (HEV) that includes an electric machine 153, however in other examples vehicle system may not be a hybrid electric vehicle system without departing from the scope of this disclosure. Electric machine 153 may be a motor or a motor/generator. Crankshaft 40 of engine 10 and electric machine 153 are connected via a transmission 155 to vehicle wheels 175 when one or more clutches 173 are engaged. In the depicted example, a first clutch is provided between crankshaft 40 and electric machine 153, and a second clutch is provided between electric machine 153 and transmission 155. Controller 12 may send a signal to an actuator of each clutch 173 to engage or disengage the clutch, so as to connect or disconnect crankshaft from electric machine 153 and the components connected thereto, and/or connect or disconnect electric machine 153 from transmission 155 and the components connected thereto. Transmission 155 may be a gearbox, a planetary gear system, or another type of transmission. The powertrain may be configured in various manners including as a parallel, a series, or a series-parallel hybrid vehicle.

Electric machine 153 receives electrical power from a traction battery 158 (also described herein as onboard energy storage device, energy storage device, or battery) to provide torque to vehicle wheels 175. Electric machine 153 may also be operated as a generator to provide electrical power to charge traction battery 158, for example during a braking operation.

Onboard energy storage device 158 may periodically receive electrical energy from a power source 191 residing external to the vehicle (e.g., not part of the vehicle) as indicated by arrow 194. As a non-limiting example, vehicle system 100 may be configured as a plug-in hybrid electric vehicle (PHEV), whereby electrical energy may be supplied to energy storage device 158 from power source 191 via an electrical energy transmission cable 193. During a recharging operation of energy storage device 158 from power source 191, electrical transmission cable 193 may electrically couple energy storage device 158 and power source 191. While the vehicle propulsion system is operated to propel the vehicle, electrical transmission cable 193 may disconnected between power source 191 and energy storage device 158. Controller 12 may identify and/or control the amount of electrical energy stored at the energy storage device, which may be referred to as the state of charge (SOC).

In other examples, electrical transmission cable 193 may be omitted, where electrical energy may be received wirelessly at energy storage device 158 from power source 191. For example, energy storage device 158 may receive electrical energy from power source 191 via one or more of electromagnetic induction, radio waves, and electromagnetic resonance. As such, it may be appreciated that any suitable approach may be used for recharging energy storage device 158 from a power source that does not comprise part of the vehicle.

FIG. 2 shows a schematic view of an example embodiment of an oxygen sensor 200 configured to measure a concentration of oxygen ($O_2$) in an intake airflow in an intake passage or an exhaust gas stream in an exhaust passage. In some examples, the sensor 200 may be a HEGO sensor. The sensor 200 may thus correspond to one or both of oxygen sensors 126 and 172 of FIG. 1, for example. It will be appreciated, however, that sensors 126 and 172 may deviate in some respects from the sensor 200—for example, they may employ one or more modifications.

As shown in FIG. 2, the sensor 200 comprises a plurality of layers of one or more ceramic materials arranged in a stacked configuration. In the embodiment of FIG. 2, three ceramic layers are depicted as layers 201, 202, and 203. These layers include one or more layers of a solid electrolyte with associated electrodes on either side of the electrolyte capable of conducting ionic oxygen and conducting electrons to the electrodes. Examples of suitable solid electrolytes include, but are not limited to, zirconium oxide-based materials. Further, in some embodiments, a heater 207 may be disposed in thermal communication with the layers to increase the ionic conductivity of the layers. While the depicted oxygen sensor is formed from five ceramic layers, it will be appreciated that the oxygen sensor may include other suitable numbers of ceramic layers.

The layer 202 includes a material or materials creating a diffusion path 210. The diffusion path 210 is configured to introduce gasses into a first internal cavity 222 via diffusion. The diffusion path 210 may be configured to allow one or more components of intake air or exhaust gases, including but not limited to a desired analyte (e.g., $O_2$), to diffuse into internal cavity 222 at a more limiting rate than the analyte can be pumped in or out by a pumping electrodes pair 212 and 214. In this manner, a stoichiometric level of $O_2$ may be obtained in the first internal cavity 222.

A pair of pumping electrodes 212 and 214 is disposed in communication with the internal cavity 222, and is configured to electrochemically pump a selected gas constituent (e.g., $O_2$) from internal cavity 222 through layer 201 and out of the sensor 200. Alternatively, the pair of pumping electrodes 212 and 214 may be configured to electrochemically pump a selected gas through layer 201 and into internal cavity 222. Herein, the pumping electrodes pair 212 and 214 may be referred to as an $O_2$ pumping cell.

The process of electrochemically pumping the oxygen out of or into the internal cavity 222 includes applying a voltage Vp across the pumping electrode pair 212 and 214. The pumping voltage Vp applied to the $O_2$ pumping cell pumps oxygen into or out of the first internal cavity 222 in order to maintain a stoichiometric level of oxygen in the cavity pumping cell. The resulting pumping current Ip is proportional to the concentration of oxygen in the exhaust gas. A suitable control system (not shown in FIG. 2) generates the pumping current signal Ip as a function of the intensity of the applied pumping voltage Vp required to maintain a stoichiometric level within the first internal cavity 222. Thus, a lean mixture will cause oxygen to be pumped out of the internal cavity 222 and a rich mixture will cause oxygen to be pumped into the internal cavity 222.

It should be appreciated that the oxygen sensor described herein is merely an example embodiment of an oxygen sensor, and that other embodiments of oxygen sensors may have additional and/or alternative features and/or designs.

It is well known that the conductivity of a material changes with temperature. For an oxygen ionic conducting electrolyte such as zirconia, the ionic conductivity typically increases as the temperature increases. Other factors such as impurities, grain boundaries, structure, and geometry can affect the conductivity of the zirconia. For a fixed geometry and structure, the impedance (which is the inverse of the conductivity) of a zirconia element is directly related to the temperature of the element. Thus, the temperature of an oxygen sensor element may be determined by measuring the impedance of the oxygen sensor element. The oxygen sensor element impedance may be measured by measuring the voltage drop across the oxygen sensor element (e.g., by using an AC technique). For oxygen sensor 200, the sensor element impedance may be specifically measured across the pumping cell 228, which comprises layer 201 and electrodes 212 and 214, for example. In this approach, impedance measurement of a cell may be based on the applied voltage and resulting current associated with that cell—e.g., the impedance of pumping cell 228 may be determined based on the pumping voltage Vp applied to the pumping cell and the resulting pumping current Ip.

In some approaches, the impedance of an oxygen sensor is used to control the temperature of the oxygen sensor. Since, as described above, the impedance of an oxygen sensor element can be used as an indication of the temperature of the sensor element, the impedance of the sensor element may be measured in real time and used to control its temperature—e.g., the output of a heater such as heater 207 may be controlled in closed loop fashion to minimize the difference between a target sensor element impedance and an actual (e.g., measured) sensor element impedance, and thus to minimize the difference between a desired sensor temperature and an actual sensor temperature. In this way, the oxygen sensor may be imbued with the desired sensor temperature by controlling heater output according to impedance.

The impedance of some oxygen sensor elements increases (e.g., exponentially) as sensor element temperature decreases. Also, the impedance of some oxygen sensor elements changes (such as increases) with aging. For an aged sensor, the target impedance corresponding to the desired sensor temperature may increase. However, if the temperature of the sensing elements is closed loop controlled based on the initial target impedance, the temperature of the cells may actually be increased beyond the desired sensor temperature. As an example, for a new oxygen sensor, a desired sensor element temperature of 750° C. may correspond to an initial target impedance of 350 ohms. After aging of the sensor, the target impedance may increase to 500 ohms. However, if the temperature is continued to be controlled based on the initial target impedance, the temperature of the cells may increase to a temperature much higher than the desired temperature 750° C. thereby causing inaccuracies in sensor operation and accelerated aging of the sensor. Therefore, as further detailed in FIGS. 3A and 3B, the target impedance of the oxygen sensor elements may be updated during drive cycles to account for aging.

FIG. 4 shows an example plot 400 of sensor element impedance as a function of temperature for an example oxygen sensor. The example oxygen sensor may correspond to one or more of oxygen sensor 126 and 172 of FIG. 1, for example. The x-axis denotes temperature of the oxygen sensor in Celsius and the y-axis denotes the sensor element impedance in Ohms. Line 402 shows the change in impedance corresponding to a change in temperature. In the depicted example, the sensor element impedance is inversely proportion to the temperature of the sensor. The sensor element impedance decreases exponentially as a function of temperature.

FIG. 5 shows an example plot (bar chart) 500 of sensor element impedance aging. The example oxygen sensor may correspond to one or more of oxygen sensor 126 and 172 of FIG. 1, for example. The y-axis denotes the sensor element impedance in Ohms. The first bar 502 shows impedance for a new, unused oxygen sensor, the second bar 504 shows impedance of an oxygen sensor that has been used for a specified time that may be typical of the life of the sensor, the third bar 506 shows impedance of an oxygen sensor that has been exposed to 50% additional life aging, and the fourth bar 508 shows impedance of an oxygen sensor that has been exposed to 100% additional life exposure. In this example, the impedance of the sensor element increases with use (over time).

In this way, the systems in FIGS. 1 and 2 provide for system for an engine in a vehicle, comprising: an oxygen sensor, and a controller storing instructions in non-transitory memory that, when executed, cause the controller to: at an initiation of a drive cycle, adjust power supplied to a heating element in thermal contact with a sensing element of the oxygen sensor based on an initial target impedance, and upon a temperature of the oxygen sensor increasing to an operating temperature range during a steady engine speed and engine load condition, estimate a difference between a commanded RMS voltage across the sensing element of the oxygen sensor and a reference RMS voltage corresponding to the first target impedance and current vehicle operating conditions; update the initial target impedance based on the difference, and adjust power supplied to the heating element based on the updated target impedance.

Figure 3A:
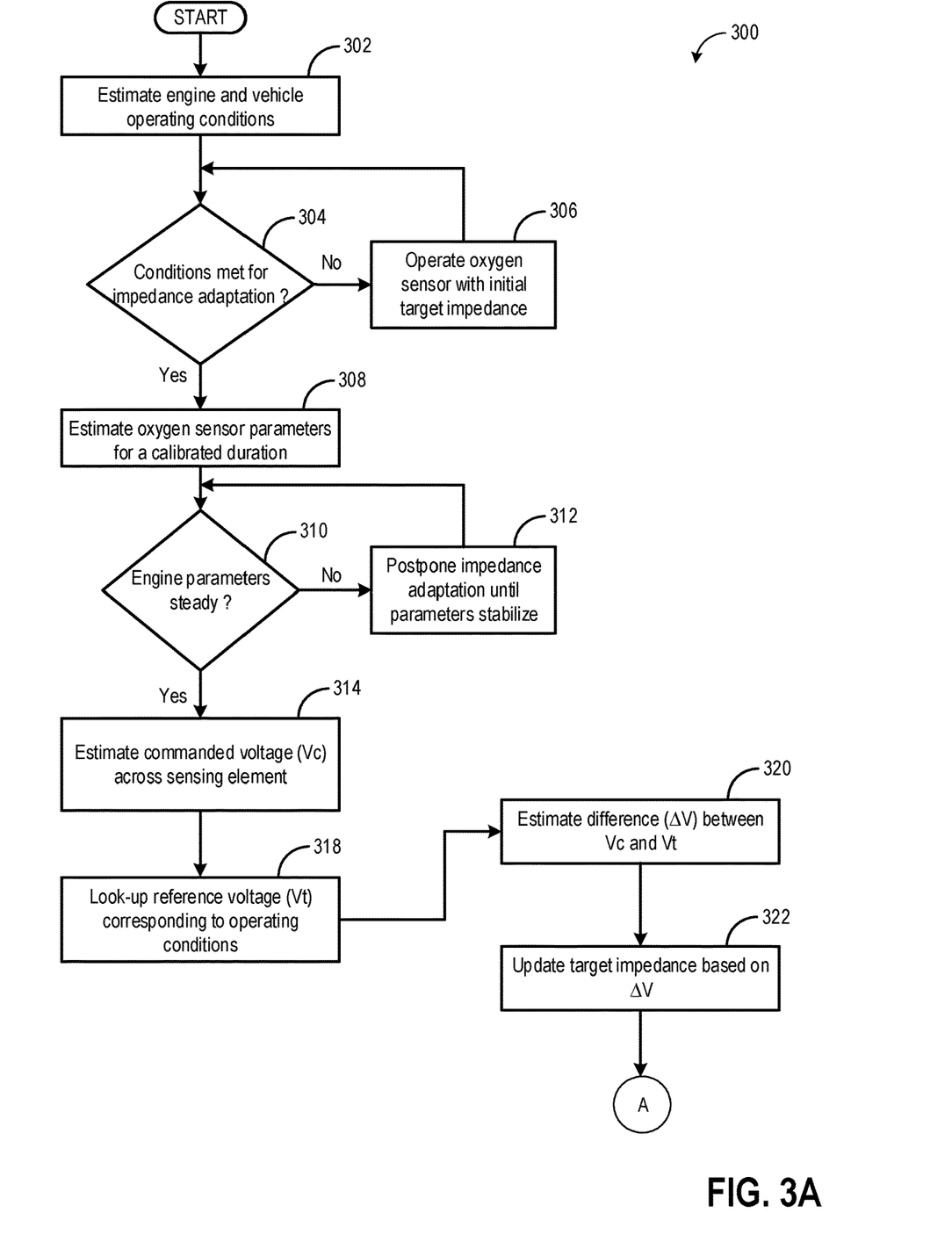
FIG. 3A shows a first part of a flow chart illustrating a method that can be implemented to adapt a target impedance of the oxygen sensor.
Figure 3B:
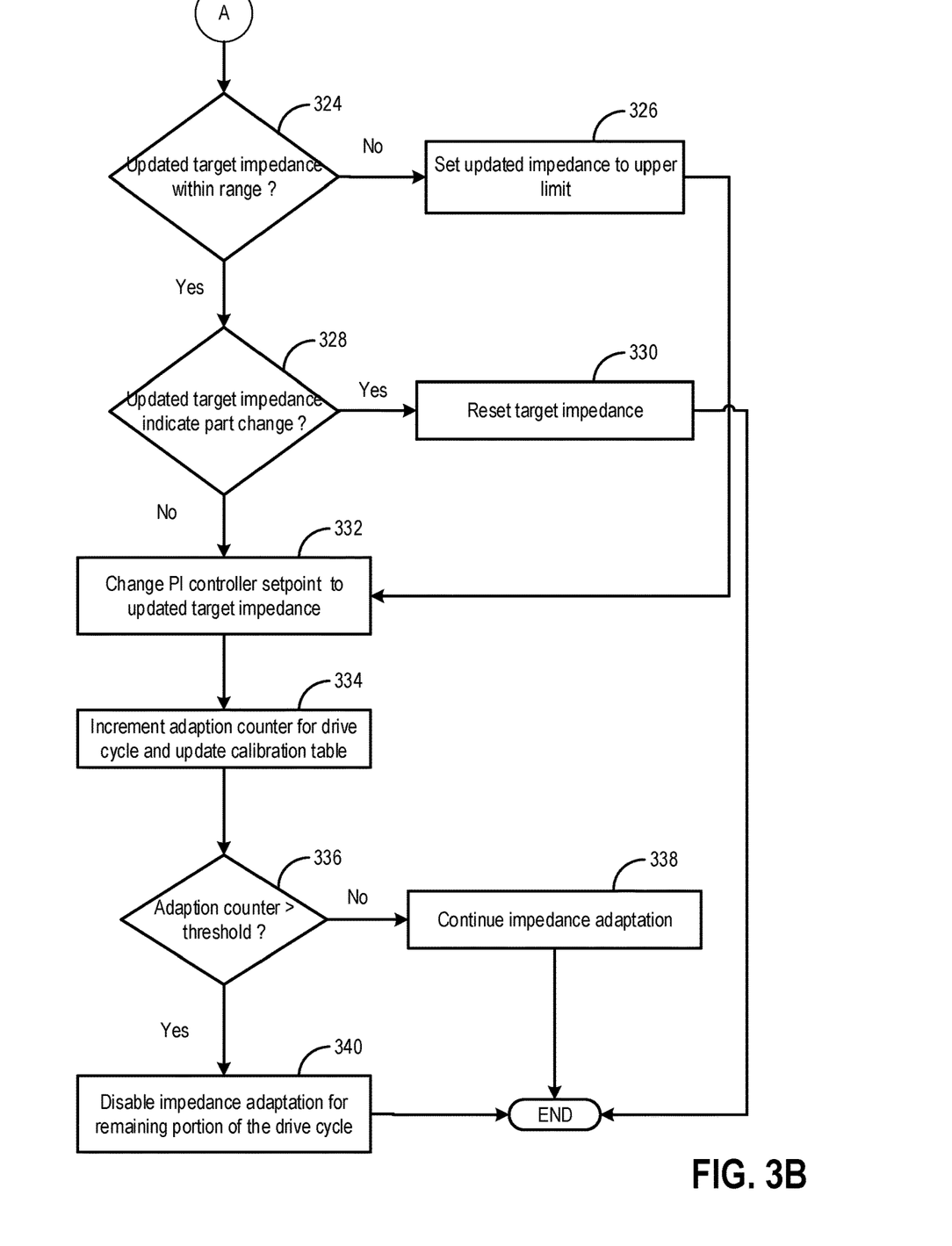
FIG. 3B shows a second part of a flow chart illustrating a method that can be implemented to adapt a target impedance of the oxygen sensor.

FIGS. 3A and 3B illustrate an example method 300 for adapting a target impedance of an oxygen sensor (such as oxygen sensor 126 and 172 of FIG. 1) based on a voltage drop across a sensing element of the oxygen sensor. Instructions for carrying out method 300 and the rest of the methods included herein may be executed by a controller based on instructions stored on a memory of the controller and in conjunction with signals received from sensors of the engine system, such as the sensors described above with reference to FIGS. 1 and 2. The controller may employ engine actuators of the engine system to adjust engine operation, according to the methods described below.

At 302, engine and vehicle operating conditions including vehicle speed, engine speed, engine load, engine temperature, etc. may be estimated. Further, the controller may retrieve an initial target temperature from the controller memory for adjusting operating temperature of the sensor. The initial target impedance may be the original target impedance of the oxygen sensor or a target impedance updated during a previous target impedance adaptation carried out during a prior drive cycle.

The operating temperature of the sensor element (such as the pumping cell 228 in FIG. 2) may be closed loop controlled based on the initial target impedance at the onset of the drive cycle. The oxygen sensor may light-off and sense oxygen concentration upon the temperature of the sensing element increasing to a temperature in a desired operating temperature range. An output of a heater (such as heater 207 in FIG. 2) in thermal communication with the sensing element may be controlled based on the initial target impedance. As an example, a controller such as a proportional-integral (PI) controller, proportional-integral-derivative (PID) controller, or a proportional-derivative (PD) controller may be used to minimize a difference between a target sensor element impedance and an actual (e.g., measured) sensor element impedance.

At 304, the routine includes determining if conditions are met for adaptation of the target impedance. The conditions may include a steady state engine operation without significant changes (such as higher than 10%) in engine load, speed, exhaust flow, and temperature. Also, the routine may confirm that any diagnostic routine for any engine component is not being carried out. If it is determined that the conditions are not met for impedance adaptation, at 306, the oxygen sensor may continue to be operated with the initial target impedance. Impedance adaptation may be delayed until the conditions are met.

If conditions are met for adaptation of the target impedance, at 308, oxygen sensor parameters may be estimated for a calibrated duration. The calibrated duration may be in a range of 5-10 seconds. The oxygen sensor parameters estimated may include a temperature of the oxygen sensor and air/exhaust flow through the oxygen sensor. As an example, air flow through an intake oxygen sensor may be estimated based on output from an intake manifold air flow sensor or calculated based on output of an air pressure sensor, and air flow through an exhaust oxygen sensor may be estimated based on output from an exhaust pressure sensor.

At 310, the routine includes determining if the engine operating parameters are substantially steady state for a calibrated duration. In one example, substantial steady state may be indicated by the engine operating parameters being within calibratable bounds for the calibrated duration. The calibratable bounds may include a target exhaust temperature with an upper temperature bound and a lower temperature bound. In one embodiment, these bounds may be in the range of 20-50° C. from the target temperature. Additionally, other parameters such as engine speed, engine load and average air fuel ratio may be monitored for stability. As an example, the oxygen sensor impedance learning will occur when exhaust flow and temperature are substantially steady—for a period of five seconds. When these conditions are present, the learning will be enabled. If it is determined that the engine operating parameters are not substantially steady state for the calibrated duration, it may be inferred that the oxygen sensor parameters are not stable for effective measurement of voltage across the sensor element for target impedance adaptation. At 312, impedance adaptation may be postponed until the oxygen sensor parameters stabilize.

If it is determined that the engine operating parameters are substantially steady state for a calibrated duration, at 314, commanded heater RMS voltage (Vc) across the sensing element may be estimated corresponding to current operating conditions such as engine speed, engine load, engine temperature, exhaust flow, and initial target impedance. Voltage drop across the oxygen sensor element may be specifically measured across the pumping cell (which comprises layer 201 and electrodes 212 and 214 in FIG. 2) for example. The commanded voltage (Vc) as measured may be a root mean square (RMS) voltage. In one example, the RMS commanded voltage (Vc) may be filtered through a low pass filter (such as a Exponentially Weighted Moving Average low pass filter).

At 318, a pre-calibrated reference voltage (Vt) across the sensing element corresponding to the current operating conditions may be looked-up or retrieved from controller memory. A table may be pre-calibrated to map a RMS voltage applied to the sensor element for heating the sensor element corresponding to a target impedance with a plurality of engine steady state speed-load conditions. The table may be stored in the controller memory and may be used to look-up the reference voltage with the current operating conditions (one or more of engine speed, engine load, engine temperature, exhaust flow, exhaust temperature, and initial target impedance) as inputs and the reference voltage as output. In one example, the reference voltage (Vt) may be filtered through a low pass filter (such as a Exponentially Weighted Moving Averages low pass filter).

At 320, a difference ($\Delta V$) is estimated between the commanded voltage (Vc) and the reference voltage (Vt). At 322, the target impedance may be updated based on the difference between the commanded voltage (Vc) and the reference voltage (Vt). In one example, the updated target impedance may be a function of the difference between Vc and Vt multiplied with a weighted factor. This updated target impedance may then be added to the previous target impedance and averaged with previous impedance target An array may include learned (updated after each iteration) impedance values for the sensor element for a range of engine operating conditions (such as one or more of engine speed, engine load, engine temperature, exhaust flow). Upon updating the target impedance, the updated value may be stored in the array. The target impedance values stored in the array together with the latest updated target impedance may be used to estimate the average target impedance. A predetermined number of values (samples) may be used for this averaging. This value of averaged target impedance may then be used as the new target impedance.

Continuing to FIG. 3B, the routine includes determining if the updated target impedance is within a threshold range. The threshold range may include a pre-calibrated first, upper limit and a second, lower limit. The lower limit may correspond to a weighted previously estimated target impedance (such as exponentially weighted moving average (EWMA) target impedance). The upper limit may correspond to a target impedance beyond which the temperature control of the sensor element may be erroneous. If it is determined that the updated target impedance is not within the threshold range, the updated target impedance may be set to the upper limit of the range. Further, a diagnostic routine of the oxygen sensor may be carried out to detect any degradation of the sensor element.

If it is determined that the updated target impedance is within the threshold range, the target impedance may be set as the updated target impedance. At 328, the routine includes determining if the updated target impedance indicates part change. With aging (over time), the target impedance of the sensor element increases. However, if it is observed that the target impedance has decreased over a threshold amount (such as more than 10%) relative to the original target impedance (used for temperature control prior to updating the target impedance) such as the target impedance at the immediately prior impedance adaptation during the current or previous drive cycle, it may be inferred that the oxygen sensor has been replaced. A part change may also be confirmed by the target impedance decreasing to that of a newer and less used sensor. If it is determined that a part change is indicated, at 330, the target impedance may be reset to that of a new or newly serviced oxygen sensor.

If a part change is not indicated, at 332, a setpoint of a PI controller used to adjust power supplied to the oxygen sensor heater may be updated to the updated target impedance. Further, the proportional and integral gain constants may be updated upon changing the setpoint. The PI controller may receive a difference (I_error) between the setpoint target impedance and actual measured impedance of the sensing element. At the PI controller, the I_error may be processed and/or modified (scaled) by a proportional gain (Kpi). The integral of the I_error may be similarly processed and/or modified (scaled) by an integral gain (Kii). One of these terms or their sum is then output to a signal. The output signal of the PI controller may be the final control signal to be sent to the heating element. Upon updating the target impedance, the difference ($\Delta V$) between the commanded voltage (Vc) and the reference voltage (Vt), as estimated in step 320, may reduce to zero.

At 334, an adaptation counter for accounting for the number of times the target impedance of the oxygen sensor has been updated may be incremented upon completion of updating the target impedance. As an example, the adaptation counter may be incremented by one upon completion of each updating of the target impedance. Further, an array may be updated to include the updated target impedance. In one example, the array may include target impedances corresponding to distinct odometers readings and engine operating conditions at regular intervals. The array may be stored in the controller memory and also shared with a central cloud/server for calibration of similar tables used in future adaptations. In another example, the array may be updated with a weighted target impedance value such as a EWMA target impedance. The last updated average value for the target impedance may be used until the next adaptation of target impedance is carried out in the current or a future drive cycle. At 336, the routine includes determining if the adaptation counter has reached a threshold. The threshold may correspond to a highest number of target impedance adaptations that may be carried out during a drive cycle. In order to refrain from frequently changing the target impedance, adaptations of the target impedance may be carried out up to the threshold number of times. In one example, the threshold number may be in the range of 3 to 5.

If it is determined that the adaptation counter is below the threshold, at 338, future impedance adaptations may be continued during the remaining portion of the drive cycle upon conditions met (such as in step 304). If it is determined that the adaptation counter has reached the threshold for the drive cycle, at 340, impedance adaptation may be disabled for the remaining portion of the drive cycle. The oxygen sensor may be operated with the last updated target impedance or the estimated average value for the target impedance.

In this way, upon conditions for target impedance adaptation being met, a commanded RMS voltage across a sensing element of the oxygen sensor corresponding to a set of current vehicle operating conditions and a current, first target impedance may be estimated, a reference RMS voltage of the sensing element corresponding to the set of current vehicle operating conditions and the first target impedance may be retrieved from a controller memory, a second target impedance as a function of a difference between the commanded RMS voltage and the reference RMS voltage may be estimated, and a temperature of the oxygen sensor may be adjusted based on the second target impedance.

FIG. 6 shows an example operating sequence 600 illustrating adaptation of target impedance in an oxygen sensor (such as oxygen sensor 126 and 172 of FIG. 1) during a drive cycle. The impedance of the oxygen sensor may increase over time due to aging and the target impedance is to be updated accordingly. The horizontal axis (x-axis) denotes time and the vertical markers t1-t3 identify significant times in the adaptation process.

The first plot, line 602, denotes an engine speed estimated via a crankshaft sensor. The second plot, line 604, shows a temperature of the oxygen sensor. Dashed line 605 denotes a threshold operating temperature (also referred as light-off temperature) at which the oxygen sensor provides a steady and accurate output. The oxygen sensor may include a sensing element for oxygen concentration estimation and a heating element thermally coupled to the sensing element for heating the sensing element and maintaining the sensor temperature at or above the threshold temperature 605. The third plot, line 606, denotes a commanded voltage applied across the sensing element of the sensor. Dashed line 608 shows a reference voltage retrieved from a look-up table. The fourth plot, line 610, denotes a target impedance of the sensor element. The oxygen sensor temperature may be controlled via a PI controller where the sensor temperature is determined based on the target impedance of the sensing element. The fifth plot, line 612, denotes a counter of a number of times the target impedance of the sensor has been updated.

Prior to time t1, the vehicle is not propelled via engine torque and the engine is maintained at rest. At time t1, the engine is started from rest and the oxygen sensor is heated via a heating element thermally coupled to a sensor element of the oxygen sensor. The power supplied to the heating element may be close loop controlled based on a target impedance of the sensor element. The target impedance is retrieved from an impedance look-up table that is updated after each impedance adaptation. As an example, the target impedance used for temperature control at the onset of the drive cycle is the EWMA impedance updated at the end of an immediately previous drive cycle as stored and obtained from the look-up table. A voltage drop across the sensor element corresponding to the target impedance is estimated.

At time t2, in response to the oxygen sensor temperature increasing to the threshold temperature 605 and engine steady state speed-load conditions being attained, adaptation of the target impedance is initiated. A pre-calibrated reference voltage across the sensing element, as shown by dashed line 608, corresponding to the current operating conditions is looked-up or retrieved from controller memory. A difference ($\Delta V$) is estimated between the estimated voltage (V1) and the reference voltage (V2). The difference $\Delta V$ is proportional to a difference sensor element and the current target in actual target impedance of the current target impedance used for sensor temperature control.

At time t3, the target impedance of the sensor element is updated from the initial target impedance T1 to updated target impedance T2. The updated target impedance is higher than the initial target impedance due to an increase in impedance of the sensor element caused by aging. After updating the target impedance, a counter for estimating a number of adaptations of the target impedance carried out over a drive cycle is incremented by one. Time t3 onwards, the target impedance is updated to the target impedance T2 and the power supplied to the heating element is adjusted based on the updated target impedance T2. Upon updating the target impedance, the difference between the estimated voltage drop across the sensor element and the reference voltage decreases to zero.

In this way, by accounting for aging in an oxygen sensor by opportunistically adapting a target voltage of the sensor element, temperature control of the oxygen sensor may be improved. By heating the sensor element based on the updated target impedance overheating of the sensor element may be reduced and further aging of the sensor may be reduced. Overall, by regularly adapting the target voltage of the oxygen sensor, the sensing element may always be heated to an operating temperature, thereby improving accuracy and reliability of oxygen sensor operation.

In another example embodiment, updating of the target impedance may be carried out based on a first RMS voltage corresponding to current operating conditions. Based on current operating conditions exhaust temperature and flow, the first output RMS voltage may be looked-up from a pre-calibrated look-up table. The commanded voltage across the sensing element of the oxygen sensor may then be temporarily adjusted to this first RMS voltage impedance measurement of sensor may be carried out. A reference impedance may be looked-up from a second calibratable look up table which with exhaust temperature and flow as inputs and the reference impedance as output. A difference between the reference impedance and measured impedance may be used to adapt the target setpoint toward the reference impedance. Once the adaption is complete, the sensor may again be operated with impedance control using a PI controller with the adapted impedance setpoint until the next adaption measurement occurs.

An example method for an engine of a vehicle, comprises: updating an initial target impedance of an oxygen sensor based on a difference between a commanded root mean square (RMS) voltage across a sensing element of the oxygen sensor and a reference RMS voltage of the sensing element corresponding to the initial impedance, and adjusting a temperature of the oxygen sensor based on the updated target impedance. In the preceding example, additionally or optionally, the commanded RMS voltage is estimated across the sensing element during vehicle operation with a first set of operating conditions and while adjusting the temperature of the oxygen sensor based on the initial target impedance. In any or all of the preceding examples, additionally or optionally, the reference RMS voltage is looked up corresponding to the initial impedance and the first set of operation conditions from a pre-calibrated table. In any or all of the preceding examples, additionally or optionally, the first set of operating conditions includes one or more of an engine speed, an engine load, an engine temperature, an exhaust flow, and an exhaust temperature. In any or all of the preceding examples, additionally or optionally, the updated target impedance is estimated based on the difference between the commanded RMS voltage and the reference RMS voltage, and the initial target impedance—In any or all of the preceding examples, the method further comprising, additionally or optionally, in response to the updated target impedance being higher than a threshold impedance, capping the updated target impedance to the threshold impedance. In any or all of the preceding examples, the method further comprising, additionally or optionally, updating the second pre-calibrated table with an exponentially weighted moving average of the updated target impedance and the odometer reading. In any or all of the preceding examples, additionally or optionally, the temperature of the oxygen sensor is closed loop controlled based on the initial target impedance upon initiation of a drive cycle with the initial target impedance as a setpoint of a proportional integral (PI) controller adjusting power supplied to an oxygen sensor heater. In any or all of the preceding examples, the method further comprising, additionally or optionally, updating the setpoint of the PI controller to the updated impedance. In any or all of the preceding examples, the method further comprising, additionally or optionally, updating a counter for a number of impedance updated being carried out during a drive cycle, and in response to a value of the counter exceeding a threshold, disabling further target impedance updates during a remaining portion of the drive cycle. In any or all of the preceding examples, the method further comprising, additionally or optionally, in response to the updated target impedance being lower than the initial target impedance, indicating a part change in the oxygen sensor. In any or all of the preceding examples, additionally or optionally, the oxygen sensor is coupled to an intake passage or an exhaust passage of the engine.

Another example for an oxygen sensor in an engine, comprises: upon conditions for target impedance adaptation being met, estimating a commanded RMS voltage across a sensing element of the oxygen sensor corresponding to a set of current vehicle operating conditions and a current, first target impedance, retrieving a reference RMS voltage of the sensing element corresponding to the set of current vehicle operating conditions and the first target impedance, estimating a second target impedance as a function of a difference between the commanded RMS voltage and the reference RMS voltage, and adjusting a temperature of the oxygen sensor based on the second target impedance. In the preceding example, additionally or optionally, adjusting the temperature includes using the second target impedance as a setpoint of a proportional integral (PI) controller adjusting power supplied to an oxygen sensor heater in thermal communication with the sensing element. In any or all of the preceding examples, additionally or optionally, the retrieving the reference RMS voltage includes looking up the RMS voltage from a first look-up table with the current vehicle operating conditions as input and the reference RMS voltage as output, the current vehicle operating conditions including one or more of an engine speed, an engine load, an engine temperature, an exhaust flow, and an odometer reading. In any or all of the preceding examples, additionally or optionally, the second target impedance is further based on the first target impedance and the current vehicle operating conditions. In any or all of the preceding examples, additionally or optionally, the conditions for target impedance adaptation includes one or more of the temperature of the oxygen sensor being within a first threshold range, an air/exhaust flow through the sensor being within a second threshold range, and a lower than threshold rate of change in engine speed and engine load.

Yet another example system for an engine in a vehicle, comprises: an oxygen sensor, and a controller storing instructions in non-transitory memory that, when executed, cause the controller to: at an initiation of a drive cycle, adjust power supplied to a heating element in thermal contact with a sensing element of the oxygen sensor based on an initial target impedance, and upon a temperature of the oxygen sensor increasing to an operating temperature range during a steady engine speed and engine load condition, estimate a difference between a weighted, commanded RMS voltage across the sensing element of the oxygen sensor and a weighted, reference RMS voltage corresponding to the first target impedance and current vehicle operating conditions, update the initial target impedance based on the difference, and adjust power supplied to the heating element based on the updated target impedance. In the preceding example, additionally or optionally, the updated target impedance is higher than the initial target impedance. In any or all of the preceding examples, additionally or optionally, updating the initial target impedance based on the difference includes estimating the updated target impedance as a function of the difference, a weighted factor, and the initial target impedance, and wherein the controller includes further instructions to: during an immediately subsequent engine operation, adjust power supplied to the heating element based on the updated target impedance.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine of a vehicle, comprising:
updating an initial target impedance of an oxygen sensor based on a difference between a commanded root mean square (RMS) voltage across a sensing element of the oxygen sensor and a reference RMS voltage of the sensing element corresponding to the initial target impedance, and adjusting a temperature of the oxygen sensor based on the updated target impedance.

2. The method of claim 1, wherein the commanded RMS voltage is determined across the sensing element during vehicle operation with a first set of operating conditions and while adjusting the temperature of the oxygen sensor based on the initial target impedance.

3. The method of claim 2, wherein the reference RMS voltage is looked up corresponding to the initial target impedance and the first set of operation conditions from a first pre-calibrated table.

4. The method of claim 2, wherein the first set of operating conditions includes one or more of an engine speed, an engine load, an engine temperature, an exhaust flow, and an odometer reading.

5. The method of claim 4, wherein the updated target impedance is estimated based on the difference between the commanded RMS voltage and the reference RMS voltage and the initial target impedance.

6. The method of claim 5, further comprising, in response to the updated target impedance being higher than a threshold impedance, capping the updated target impedance to the threshold impedance.

7. The method of claim 5, further comprising, updating a second pre-calibrated table with an exponentially weighted moving average of the updated target impedance and the odometer reading.

8. The method of claim 1, wherein the temperature of the oxygen sensor is closed loop controlled based on the initial target impedance upon initiation of a drive cycle with the initial target impedance as a setpoint of a proportional integral (PI) controller adjusting power supplied to an oxygen sensor heater.

9. The method of claim 8, further comprising, updating the setpoint of the PI controller to the updated target impedance.

10. The method of claim 8, further comprising, updating a counter for a number of impedance updates being carried out during the drive cycle, and in response to a value of the counter exceeding a threshold, disabling further target impedance updates during a remaining portion of the drive cycle.

11. The method of claim 1, further comprising, in response to the updated target impedance being lower than the initial target impedance by over a threshold amount, indicating a part change in the oxygen sensor.

12. The method of claim 1, wherein the oxygen sensor is coupled to an intake passage or an exhaust passage of the engine.

13. A method for an oxygen sensor in an engine, comprising:
upon conditions for target impedance adaptation being met,
estimating a commanded RMS voltage across a sensing element of the oxygen sensor corresponding to a set of current vehicle operating conditions and a current, first target impedance;
retrieving a reference RMS voltage of the sensing element corresponding to the set of current vehicle operating conditions and the first target impedance;
estimating a second target impedance as a function of a difference between the commanded RMS voltage and the reference RMS voltage; and
adjusting a temperature of the oxygen sensor based on the second target impedance.

14. The method of claim 13, wherein adjusting the temperature includes using the second target impedance as a setpoint of a proportional integral (PI) controller adjusting power supplied to an oxygen sensor heater in thermal communication with the sensing element.

15. The method of claim 13, wherein the retrieving the reference RMS voltage includes looking up the reference RMS voltage from a look-up table with the current vehicle operating conditions as input and the reference RMS voltage as output, the current vehicle operating conditions including one or more of an engine speed, an engine load, an engine temperature, and an exhaust flow.

16. The method of claim 13, wherein the second target impedance is further based on the first target impedance and the current vehicle operating conditions.

17. The method of claim 13, wherein the conditions for target impedance adaptation includes one or more of the temperature of the oxygen sensor being within a first threshold range, an air/exhaust flow through the oxygen sensor being within a second threshold range, and a lower than threshold rate of change in engine speed and engine load.

18. A system for an engine in a vehicle, comprising:
an oxygen sensor; and
a controller storing instructions in non-transitory memory that, when executed, cause the controller to:
at an initiation of a drive cycle, adjust power supplied to a heating element in thermal contact with a sensing element of the oxygen sensor based on an initial target impedance; and
upon a temperature of the oxygen sensor increasing to an operating temperature range during a steady engine speed and engine load condition,
estimate a difference between a weighted, commanded RMS voltage across the sensing element of the oxygen sensor and a weighted, reference RMS voltage corresponding to the initial target impedance and current vehicle operating conditions;
update the initial target impedance based on the difference; and
adjust power supplied to the heating element based on the updated target impedance.

19. The system of claim 18, wherein the updated target impedance is higher than the initial target impedance.

20. The system of claim 18, wherein updating the initial target impedance based on the difference includes estimating the updated target impedance as a function of the difference, a weighted factor, and the initial target impedance, and wherein the controller includes further instructions to:
during an immediately subsequent engine operation, adjust power supplied to the heating element based on the updated target impedance.

* * * * *